March 21, 1944.   D. H. ANNIN   2,344,583
FLOW CONTROL APPARATUS
Filed Jan. 30, 1942   3 Sheets-Sheet 1
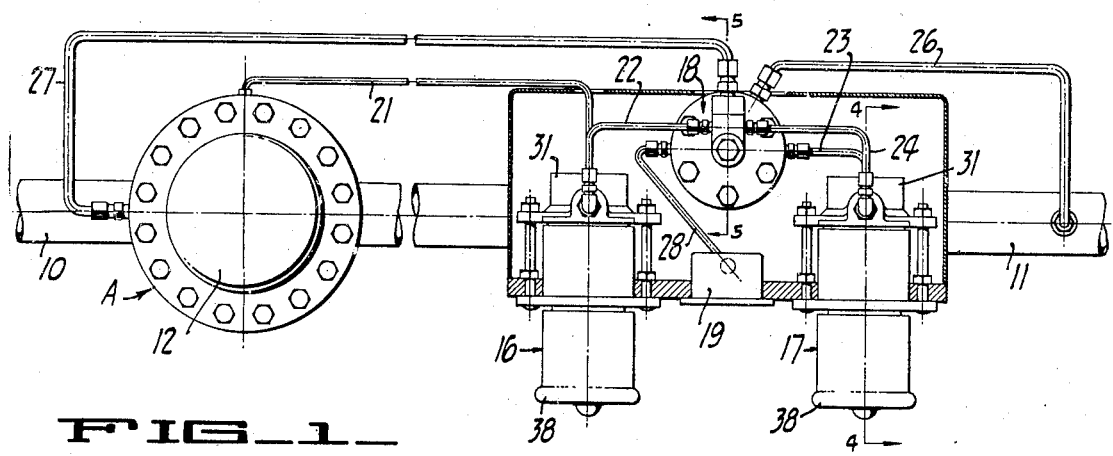
FIG_1_
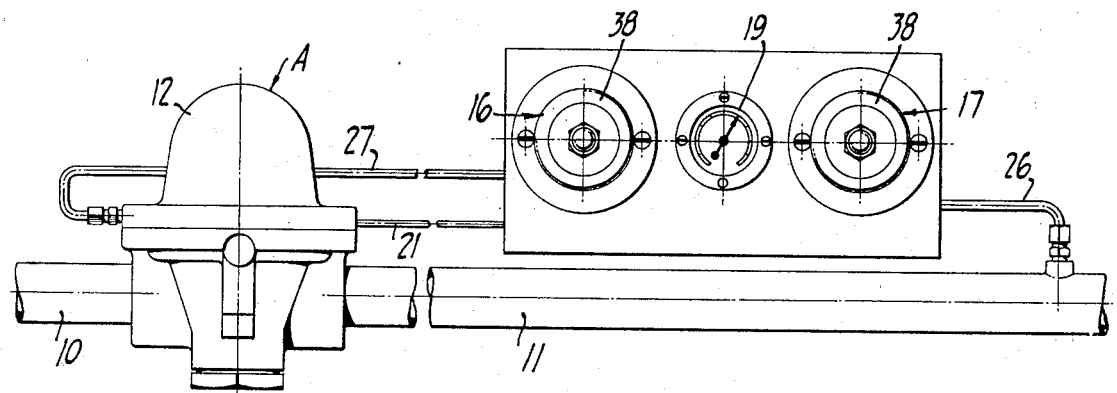
FIG_2_
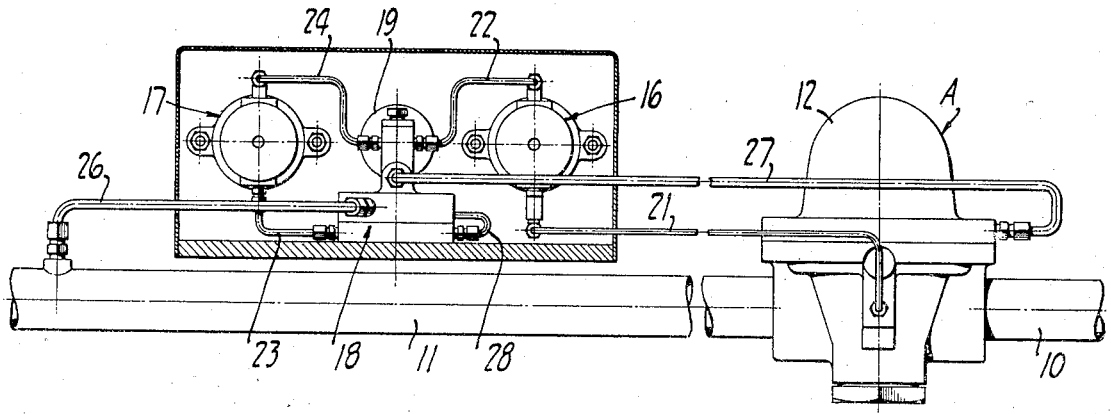
FIG_3_
INVENTOR
Douglas H. Annin
BY Paul D. Flehr
ATTORNEY March 21, 1944. D. H. ANNIN 2,344,583
FLOW CONTROL APPARATUS
Filed Jan. 30, 1942 3 Sheets-Sheet 2
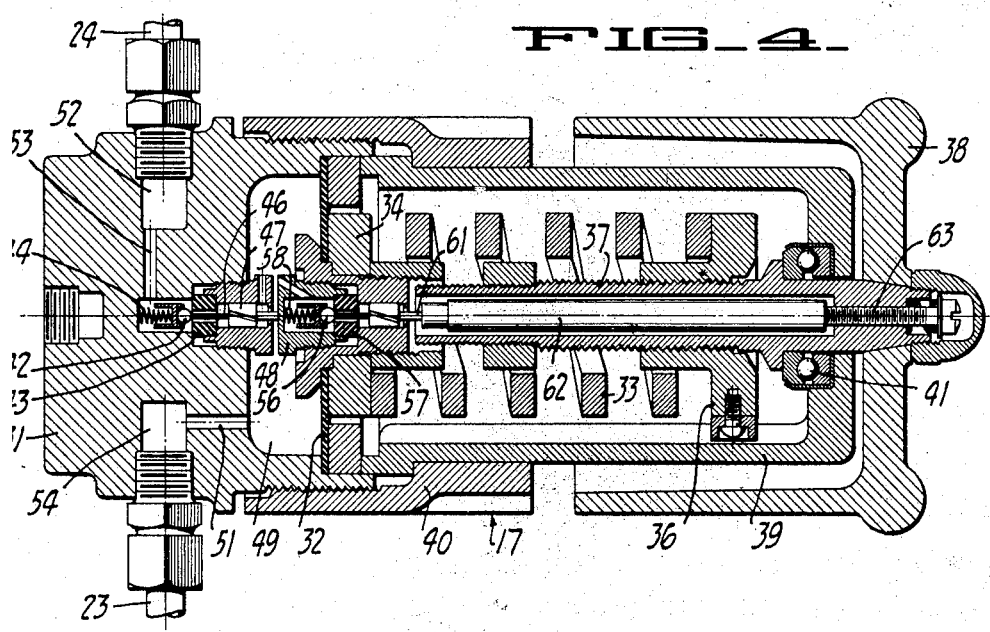
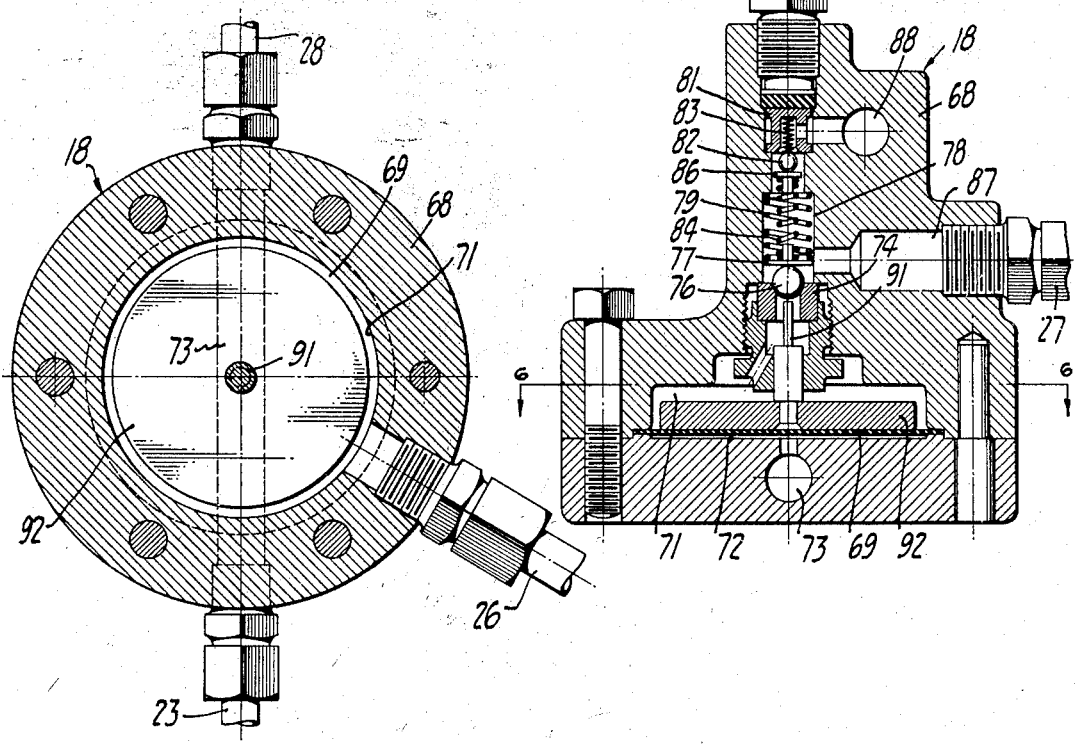
INVENTOR
Douglas H. Annin
BY Paul O. Fisher
ATTORNEY March 21, 1944.    D. H. ANNIN    2,344,583
FLOW CONTROL APPARATUS
Filed Jan. 30, 1942    3 Sheets-Sheet 3
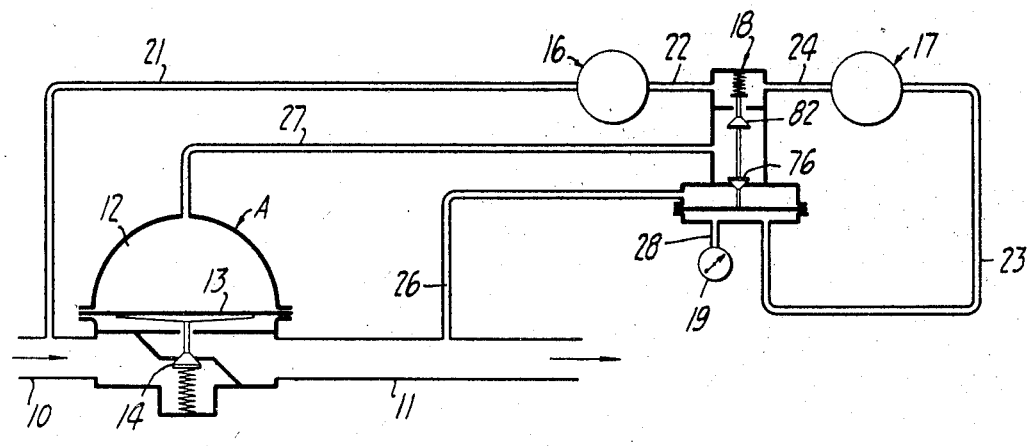
INVENTOR
Douglas H. Annin
BY
ATTORNEY Patented Mar. 21, 1944

2,344,583

UNITED STATES PATENT OFFICE 2,344,583

FLOW CONTROL APPARATUS

Douglas H. Annin, Oakland, Calif., assignor to Fluid Control Engineering Co., a co-partnership consisting of Marvin H. Grove and Julia E. Grove, both of Piedmont, Calif.

Application January 30, 1942, Serial No. 428,843

6 Claims. (Cl. 50—4)

This invention relates generally to apparatus for controlling fluid flow from a source of fluid under pressure, to a point of demand where the fluid is desired at a relatively lower regulated pressure.

It is an object of the invention to provide apparatus of the above character which will afford an automatic shutoff to prevent further flow of fluid from a high pressure source, where the outflow pressure falls to a predetermined value below normal, as may happen for example due to breakage of the low pressure piping.

A further object of the invention is to provide apparatus of the above character in which the pressure at which the apparatus shuts off can be adjusted to a value desired, and whereby the apparatus can be readily reset for normal operation after automatically shutting off.

Another object of the invention is to provide apparatus of the above character which will serve to accurately regulate the outflow pressure to a desired value, in addition to affording automatic shutoff in the event the outflow pressure falls to a predetermined value below the normal regulated pressure.

Additional objects of the invention will appear from the following description in which the preferred embodiment has been set forth in detail in conjunction with the accompanying drawings.

Referring to the drawings:

Figure 1 is a plan view showing apparatus incorporating the present invention;

Figure 2 is a front view of the apparatus shown in Figure 1;

Figure 3 is a back view of the apparatus shown in Figure 1;

Figure 4 is a cross sectional detail taken along the line 4—4 of Figure 1, and showing details of one of the loading regulators;

Figure 5 is a cross sectional view on an enlarged scale, taken along the line 5—5 of Figure 1, and showing details of the control valve device, which is used in effecting automatic tripping of the main valve;

Figure 6 is a cross sectional view taken along the line 6—6 of Figure 5; and

Figure 7 is a diagrammatic view illustrating certain parts in cross section, and facilitating an explanation with respect to operation of the apparatus as a whole.

In general, the present apparatus makes use of a main pressure reducing valve, which has its inflow side connected to a source of gas under pressure, and its outflow side connected by piping to a point of gas demand. This regulator can be set to provide a regulated pressure upon the outflow side which is relatively independent of variations in demand or of variations in pressure upon the inflow side. Associated with this main pressure reducing regulator are devices including a control valve, which are operated automatically when the outflow pressure falls below the normal range of regulation, to effect a shutoff of the main valve, thus rendering the apparatus inoperative until reset.

As illustrated in Figures 1 to 3 of the drawings, pipe 10 serves to connect the inflow side of the automatic pressure regulator A to a source of gas under pressure, which may be compressed air. Pipe 11 connects the outflow side of the regulator to a point of gas demand, as for example throttling valves through which the gas escapes, devices actuated by fluid under pressure, or the like. It is preferable that the regulator A be of a type in which the operating diaphragm is loaded by means of gas under pressure, in place of the more conventional spring. A regulator which will give good results over a wide range of outflow pressures is disclosed in Patent No. 2,047,101, granted July 7, 1936. Such a regulator is indicated in Figures 1 to 3 inclusive, and the working parts are shown diagrammatically in Figure 7. Dome 12 forms a chamber upon one side of the operating diaphragm 13, and normally the pressure of gas maintained in this chamber serves to determine the value of the regulated pressure upon the outflow side. The single valve member 14 is operated by diaphragm 13, as described in said Patent No. 2,047,101. This regulator can be quickly shut off simply by venting gas from the dome 12.

The additional parts of the apparatus shown in Figures 1 to 3 inclusive include the loading regulators 16 and 17 and the control valve 18. Also it is desirable to provide a pressure gauge 19.

The loading regulators 16 and 17 can be duplicates, and are preferably small capacity combination reducing and back pressure valves capable of being adjusted over a wide range of outflow pressures. A suitable type of regulator for this purpose is disclosed and claimed in application Serial No. 308,622, filed December 11, 1939. Pipe 21 is shown connecting the inlet side of the loading regulator 16 with the body of the main regulator A. This connection serves in effect to establish communication with the inlet high pressure pipe 10. Pipe 22 connects the outlet side of loading regulator 16 with the control valve 18. Pipe 23 connects the inlet of loader 17 with control valve 18, while pipe 24 connects the outlet side of the loader with control valve 18. Pipe 26 also connects control valve 18 with the low pressure pipe 11, while pipe 27 connects the control valve 18 with the main regulator A, particularly with the chamber formed by dome 12. Pressure gauge 19 is shown connected by a pipe 28 to the body of control valve 18, as will be presently explained.

Figure 4 illustrates a loading regulator of the type disclosed in said application Serial No. 308,622. Briefly, this small regulator consists of a body 31, to which the inlet and outlet pipes are connected, and which carries a flexible fluid operated diaphragm 32. The diaphragm is loaded by the compression spring 33, one end of which is seated upon the disc 34 which in turn presses upon the flexible diaphragm 32 and is a part of the diaphragm assembly. The other end of spring 33 is seated upon the nut 36, which is threaded upon the hollow stem 37. A hand wheel or knob 38 is mounted upon the outer end of stem 37, so that by turning this knob the tension upon spring 33 can be varied. Spring 33 is enclosed by the casing 39, which is clamped upon the body 31 by the threaded ferrule 40. Nut 36 carries a stud 36a which engages in a guide track or groove 39a formed in carriage 39. Threaded stem 37 is journaled upon the casing 39, by the thrust bearing 41.

Disposed within the body 31 there is a valve element in the form of a ball 42, which cooperates with the seat ring 43. The light compression spring 44 normally tends to urge ball 42 towards its seat. It can be forced to open position from seat 43 by thrust pin 46, which in turn is provided with a fluted guide 47.

The adjacent side of the diaphragm assembly carries a fitting 48, which serves to engage and operate the pin 46. Body 31 is formed to provide the closed chamber 49 on the inner side of the diaphragm, and this chamber is connected to the outflow side by the duct 51. When the ball 42 is displaced from its seat, fluid can flow from the inlet 52, through duct 53, seat ring 43, to chamber 49, and thence through duct 51 to the outflow passage 54. Thus, a simple automatic pressure reducing valve is formed, serving to maintain a substantially constant outflow pressure.

It is desirable but not essential that the loading regulators also incorporate means for venting fluid from the outflow passage 54, in the event the outflow pressures (of the loading regulators) rise above the desired values. In the type of loader illustrated this is accomplished by the use of a pressure relief valve which includes a valve element in the form of a ball 56, which cooperates with the seat ring 57 and is urged against this seat by spring 58. The ball 56 and spring 58 are mounted within the fitting 48, as a part of the diaphragm assembly, and the valve ball is moved from its seat by the thrust pin 61. One end of this pin is adapted to be engaged by the inner end of a rod 62, which in turn is carried by a screw 63, threaded through the outer end of the sleeve 37. By turning screw 63, the position of rod 62 can be adjusted, and one can therefore adjust the pressure differential between normal outflow pressure and the greater pressure at which fluid from the outflow side is bypassed to the atmosphere, through the relief valve means.

To briefly review the operation of the loading regulator illustrated in Figure 4, it is assumed that the inlet 52 is connected to a source of fluid under pressure. Pressure at a predetermined value will be automatically maintained in the outflow passage 54, and this pressure can be adjusted by turning the hand wheel 38. Should the pressure upon the outflow passage 54 build up to a value somewhat greater than the desired regulated pressure, the diaphragm 32 is flexed to the right as viewed in Figure 4, to cause opening of the ball 56, thus permitting fluid from chamber 49 to vent to the atmosphere through the seat ring 57.

A suitable control valve is shown in Figures 5 and 6. It consists of a body 68, within which is a fluid operated flexible diaphragm 69. Fluid chambers 71 and 72 are formed on opposite sides of the diaphragm. Chamber 72 communicates with a passage 73, and it is this passage to which pipes 23 and 28 connect (Figure 6). A seat ring 74 is mounted in the body above the diaphragm 69, and cooperates with the valve element or ball 76. The upper side of ball 76 is engaged by the thrust washer 77, which is loosely fitted within the bore 78. A compression spring 79 presses downwardly upon thrust disc 77, to normally urge the ball 76 upon its seat.

In the upper part of the body 68 there is a second seat ring 81 which cooperates with the valve element or ball 82. Ball 82 is normally urged away from its seat by the light compression spring 83. Motion transmitting means extends between the balls 76 and 82, so that when ball 76 is opened ball 82 is closed. The motion transmitting connection in this instance is a spring 84, which has its lower end seated upon disc 77, and its upper and seated upon a button 86, which in turn engages the lower side of the ball 82. Passage 87 in the body makes connection with the pipe 27, while the passage 88 makes connection with both the pipes 22 and 24. When the ball 76 is forced from its seat, chamber 71 is placed in communication with the passage 87. When ball 82 is opened, or displaced from its seat, passages 87 and 88 are placed in communication. Thrust pin 91 is mounted upon the diaphragm plate 92, which in turn engages the upper side of the diaphragm 69. When diaphragm 69 is flexed upwardly by sufficient pressure in chamber 72, the thrust pin 91 engages ball 76 to displace it from its seat.

Operation of the apparatus as a whole can best be understood by reference to diagrammatic Figure 7. In this figure, pipes 21 and 26 have been shown directly connected to the inlet and outlet pipes to the main regulator A. Likewise, for simplicity the dome of the main regulator is shown directly connected with pipe 27. Assuming that the valve member 82 is opened and valve member 76 closed, as illustrated in Figure 7, a constant regulated pressure is maintained upon the outlet side of the main regulator, and this pressure will be determined by the setting of the loading regulator 16. In other words, by varying the outlet pressure of the loading regulator 16, the pressure in the dome of the main regulator A can be varied, and thus the pressure maintained in the outflow piping 11 can be adjusted to suit requirements. Loading regulator 17 is set to some pressure substantially below the normal regulated pressure. For example, if the normal regulated pressure is 100 pounds per square inch, loading regulator 17 can be set at a lower value of say, 20 pounds per square inch. Both sides of the diaphragm of the control valve means 18 are subjected to fluid pressure, the upper side being subjected to the outflow pressure in piping 11, through pipe 26, while the lower side is subjected to the outflow pressure from the loading regulator 17. Thus, under such conditions, the diaphragm of the control valve means 18 is urged downwardly, to maintain the ball 82 open and ball 76 closed. When the outflow pressure in piping 11 falls to a value below that for which loading regulator 17 is set, which may result for example from a total rupture of the piping 11, the pressure upon the upper side of the diaphragm for control valve 18 drops to a value less than that delivered by the loading regulator 17, and therefore this diaphragm is forced upwardly to close valve 82, and to open valve 76. As a result, gas pressure in the main regulator A is free to vent through pipe 27, past valve element 76, and through pipe 26 to the outflow piping 11. This causes immediate shutoff or closure of the main regulator A, thus preventing wastage of gas.

In order to reset the apparatus after a shutdown, one first reduces the pressure delivered by the loading regulator 17. Thus, the control knob of regulator 17 is turned to its lowest pressure setting, and this results in a dropping of pressure in the chamber below the diaphragm 69, so that ball 76 closes, and ball 82 opens. Thereafter, regulator 17 is reset to the desired trip pressure.

The apparatus described above is relatively simple in both construction and operation, and it is highly reliable in effecting the desired shutoff, upon rupture of the outflow piping. Also the apparatus is capable of a high degree of flexibility with respect to adjustments of outflow pressure, and adjustments with respect to the shutoff pressure.

I claim:

1. In flow control apparatus, a main pressure reducing regulator having its inflow side adapted for connection to a high pressure fluid supply line and its outflow side adapted for connection with a low pressure line, said regulator being characterized by an operating diaphragm and a chamber upon one side of the diaphragm adapted to contain gas under pressure to form the loading force upon the diaphragm, the pressure in said chamber serving to determine the pressure maintained upon the outflow side of the regulator, means including an adjustable loading regulator serving to supply gas at a predetermined desired pressure to said chamber, control valve means connected to said chamber and serving when opened to vent gas from the same, whereby the regulator is caused to shut off flow of gas to the outflow side, an operating diaphragm connected to said control valve means, closed fluid chambers formed upon opposite sides of said diaphragm, a connection between one of said chambers and the outflow side of the regulator, whereby fluid pressure from the outflow side of the regulator urges the diaphragm in a direction to maintain the control valve means closed, and means including a second adjustable loading regulator for supplying gas under pressure to the other one of said last named chambers, whereby upon adjusting said last named loading regulator the apparatus can be set to effect automatic closing of the main regulator, when the outflow pressure drops down to a predetermined abnormally low value.

2. In flow control apparatus, a main pressure reducing valve having its inflow side adapted for connection to a high pressure fluid supply line and its outflow side adapted for connection with a low pressure line, said regulator having an operating diaphragm and a closed gas chamber upon one side of the diaphragm, gas under pressure in said chamber serving to form the loading force on the diaphragm and serving to determine the pressure maintained upon the outflow side, an adjustable loading pressure reducing regulator, said loading regulator having its inflow side connected to the inflow side of the main regulator and having its outflow side connected to the chamber of the main regulator, a second pressure reducing loading regulator having its inflow side connected to the outlet side of the first loading regulator, a second flexible diaphragm, means forming closed chambers upon opposite sides of the second diaphragm, means forming a fluid connection between one of said chambers and the outlet side of the second loading regulator, and also a fluid connection between the other chamber and the outlet side of the main regulator, and control valve means connected to said diaphragm and operated by the same between two operating positions, in one of which the gas chamber of the main regulator has normal communication with the outlet side of the first loading regulator while the pressure on the outflow side of the main loading regulator urges the second operating diaphragm in a direction to maintain said valve means in such normal position, and in the second position of which communication between the chamber of the main regulator and the outflow side of the first loading regulator is interrupted, and the chamber of the main regulator is vented, said last named position of the control valve means being effected by movement of the second operating diaphragm by the pressure of gas from the second loading regulator.

3. A flow control apparatus comprising a main pressure reducing valve having its inflow side adapted for connection to a high pressure fluid supply line and its outflow side adapted for connection with a low pressure line, said reducing valve being characterized by a valve member and a fluid operating diaphragm having chambers on both sides of the diaphragm and connected to operate the valve member, the chamber on one side adapted to receive gas under pressure to form the loading force upon the diaphragm and to urge the diaphragm in a direction to open the valve member, and the chamber on the other side being in unrestricted communication with the outflow side of the regulator, control valve means for controlling venting of said one chamber, and means for automatically opening said valve means when the pressure upon the outflow side of the regulator and in said other chamber falls below a predetermined value below the normally maintained regulated pressure.

4. In flow control apparatus, a pressure reducing regulator, said regulator having its inflow side adapted for connection to a high pressure fluid supply line and its outflow side adapted for connection with a low pressure line, said reducing valve being characterized by a flow regulating valve member and a fluid operated diaphragm connected to operate the valve member and having chambers on both sides of the same, the chamber on one side of the diaphragm adapted to contain gas under pressure to form the loading force on the diaphragm tending to urge the same in a direction to open said valve member, and the chamber on the other side of the diaphragm having unrestricted communication with the outflow side, the pressure of the gas in said one chamber serving to determine the regulated fluid pressure automatically and continuously maintained upon the outflow side of the regulator, adjustable means for supplying gas at a predetermined pressure to said one chamber, control valve means movable to open position to vent gas from said one chamber, thereby effecting reduction of pressure in the same to substantially atmospheric, and means for automatically opening said valve means when the pressure upon the outflow side of the regulator and in said other chamber falls below a predetermined value below the normally maintained regulated pressure.

5. A flow control apparatus comprising a pressure reducing valve having its inflow side adapted for connection to a high pressure fluid supply line and its outflow side adapted for connection with a low pressure line, said reducing valve being characterized by a flow regulating valve member and an operating diaphragm connected to operate the valve member and having chambers upon both sides of the diaphragm, one chamber being adapted to receive gas under pressure to load the regulator and to urge the valve member in a direction to open the valve member, and the other chamber having unrestricted communication with the outflow side, the pressure in said one chamber serving to determine the regulated fluid pressure continuously maintained upon the outflow side of the regulator, control valve means serving when open to vent gas from said one chamber, a fluid pressure operated diaphragm connected to operate said control valve means, means forming a gas chamber upon one side of said last named diaphragm, a connection between said last named chamber and the outflow side of the main regulator, whereby pressure from the outlet side of the main regulator is impressed upon one side of said last named diaphragm to urge the diaphragm in a direction to maintain the control valve means closed, and means for applying a loading force upon the other side of the last named diaphragm, said last named loading force serving to determine the pressure at which the last named diaphragm is operated to open said control valve means, upon an abnormal drop in pressure upon the outflow side of the regulator below the set regulated pressure.

6. In flow control apparatus, a pressure reducing regulator having its inflow side adapted for connection to a high pressure fluid supply line and its outflow side adapted for connection with a low pressure line, said regulator being characterized by a regulating valve member and an operating diaphragm connected to the regulating valve member and having gas chambers on both sides of the same, one chamber on one side of the diaphragm adapted to maintain gas under pressure to form a normal loading force on the diaphragm tending to urge the diaphragm in a direction to open the regulating valve member, and the other chamber being in unrestricted communication with the outflow side, means for supplying loading gas to said chamber to determine the regulated pressure normally and continuously maintained on the outflow side, control valve means serving when opened to vent gas from said one chamber, a second diaphragm connected to said valve means, means forming closed chambers upon both sides of said second diaphragm, a connection between one of said last named chambers and the outflow side of the regulator whereby pressure of fluid from the outflow side of the regulator urges the second diaphragm in a direction to maintain the control valve means closed, and a connection between the other chamber of the second diaphragm and a source of loading gas, said source of loading gas being at a pressure substantially below the normal regulated pressure upon the outflow side of the regulator, whereby when the pressure upon the outflow side of the regulator falls below a normal value, to the value determined by said last named loading pressure, said second diaphragm effects opening of said control valve means to vent pressure from the regulator chamber, thus causing the regulator to close.

DOUGLAS H. ANNIN.